(12) United States Patent
Kamba

(10) Patent No.: US 6,516,323 B1
(45) Date of Patent: Feb. 4, 2003

(54) TELECOM KARAOKE SYSTEM

(75) Inventor: Tomonari Kamba, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 08/995,168

(22) Filed: Dec. 19, 1997

(30) Foreign Application Priority Data

Dec. 19, 1996 (JP) .............................. 8-354368

(51) Int. Cl.[7] .......................... G06F 17/30; G09B 5/00
(52) U.S. Cl. ............................... 707/104.1; 434/307 A
(58) Field of Search ................... 707/1–3, 10, 104.1; 709/201–203, 217–219; 434/307 R, 307 A (56) References Cited

U.S. PATENT DOCUMENTS

| | | | | |
|---|---|---|---|---|
| 5,250,747 A | * | 10/1993 | Tsumura ................. | 434/307 A |
| 5,262,765 A | * | 11/1993 | Tsumura et al. ............ | 345/473 |
| 5,464,946 A | * | 11/1995 | Lewis ......................... | 84/609 |
| 5,532,923 A | * | 7/1996 | Sone ............................. | 700/9 |
| 5,589,947 A | * | 12/1996 | Sato et al. .................... | 386/96 |
| 5,808,223 A | * | 9/1998 | Kurakake et al. ............. | 84/609 |
| 5,810,603 A | * | 9/1998 | Kato et al. .............. | 434/307 A |
| 5,854,619 A | * | 12/1998 | Kato .......................... | 345/116 |
| 5,880,386 A | * | 3/1999 | Wachi et al. ................. | 84/601 |
| 5,919,047 A | * | 7/1999 | Sone ...................... | 434/307 A |
| 5,953,005 A | * | 9/1999 | Liu .......................... | 707/500.1 |

FOREIGN PATENT DOCUMENTS

| | | |
|---|---|---|
| JP | 5-114959 | 5/1993 |
| JP | 6-67682 | 3/1994 |
| JP | 6-102888 | 4/1994 |
| JP | 6-245208 | 9/1994 |
| JP | 6-318090 | 11/1994 |
| JP | 6-324693 | 11/1994 |
| JP | 07-210182 | 8/1995 |
| JP | 07-226017 | 8/1995 |
| JP | 7-327222 | 12/1995 |
| JP | 08-44379 | 2/1996 |
| JP | 08-87286 | 4/1996 |
| JP | 08-129395 | 5/1996 |
| JP | 08-146976 | 6/1996 |
| JP | 08-160971 | 6/1996 |
| JP | 8-320694 | 12/1996 |
| JP | 10-20877 | 1/1998 |

OTHER PUBLICATIONS

Nikkei Multimedia No. 16, Oct. 1996, p. 51. (no translation).
Nikkei Multimedia No. 11, May 1996, pp. 148–153. (no translation).
Nikkei Multimedia No. 12, Jun. 1996, pp. 59–61. (no translation).
Computers and LANs, published Apr. 1996 by Ohmsha, Ltd., pp. 86–92. (no translation).
Nikkei Multimedia No. 11, 1996.5, p. 148–153 (no translation).
Nikkei Multimedia No. 12, 1996.6, p. 59–61 (no translation).
Nikkei Multimedia No. 16, 1996.10, p. 51 (no translation).

* cited by examiner

*Primary Examiner*—Maria N. Von Buhr
(74) *Attorney, Agent, or Firm*—Foley & Lardner (57) ABSTRACT

A telecom karaoke system is configured by linking a musical data receiving terminal for receiving from a host base station necessary data for musical performance and a WWW page access terminal for accessing a page or a document on WWW via a WWW server. In this configuration, the musical data receiving terminal sequentially transmits to the WWW page access terminal the addresses of pages on WWW, superposed on the musical data. Further, the WWW page access terminal, when a musical number is selected, notifies the information on music selection to the data receiving terminal and, at the same time, updates data related to the musical number (a list of the number of accesses and the like) on the WWW server.

11 Claims, 9 Drawing Sheets

TELECOM KARAOKE SYSTEM

BACKGROUND OF THE INVENTION

1. Field of the Invention

The present invention relates to a telecom (telecommunicated) karaoke (recorded song accompaniment) for performing music at a terminal in accordance with musical data delivered via a communication line from a host base station, and more particularly to a telecom karaoke system in which the performance of music and World Wide Web (WWW), a hypermedia database on Internet, are linked together.

2. Description of the Related Art

Telecom karaoke systems for picking out, via a communication line, musical data accumulated at a host base station and performing music at terminals are commonly known. An example of such telecom karaoke system is X-55, a production of Taito Co., Ltd.

Usually in karaoke performance, the text of the song and pictorial images to dramatize its atmosphere are shown in synchronism with the performance of the accompanying music. For instance the Gazette of the Japanese Patent Laid-open No. 146976/1996 (hereinafter called Reference 1) discloses a telecom karaoke system in which diverse pictorial data are stored in advance on laser disks at its terminals, and each terminal can show the visual data in synchronism with the performance of the music by receiving from the host station the musical data and the address signals of pictures to be displayed in synchronism with the musical data.

Or in the Gazette of the Japanese Patent Laid-open No. 129395/1996 (Reference 2), for example, there is disclosed a telecom karaoke system in which picture signals are sent to its terminals from the host station and stored at the terminals so that the pictures can be displayed in synchronism with the subsequently transmitted music.

Further in the Gazette of the Japanese Patent Laid-open No. 87286/1996 (Reference 3), a method is disclosed by which not only musical data but also news and other data are received from the host station and played back.

By way of another example, the Gazette of the Japanese Patent Laid-open No. 160971/1996 (Reference 4) discloses a system in which the host station superposes the address of the text which is to be displayed at the time of playback on the MIDI standard musical data of the music, and delivers the address-superposed data; each terminal displays the text, which is stored in advance, in synchronism with the playback of the music in accordance with the data received from the host station.

Furthermore in the Gazette of the Japanese Patent Laid-open No. 226017/1995, for example, there is disclosed a performance recording/reproducing apparatus which can superpose MIDI signals and closed caption signals on the signals of scanning lines during the vertical line-erased period of video signals, and play them back in synchronism.

The methods so far described are those used to display the text and pictorial images in synchronism with the performance of the music in telecom karaoke, or to use the terminals not only for the performance of karaoke music but also for data communication.

Next, telecom karaoke also allows its users to store data including the musical numbers chosen by them for subsequent use.

For example, the Gazette of the Japanese Patent Laid-open No. 44379/1996 (Reference 6) a karaoke apparatus which logs the performance history of musical numbers by karaoke, takes out the data from the host base station as required, and thereby keeps track of the frequency of the performances of each number. The data of this performance history can be utilized in calculating advertising fees or the like. It also allows the host station to chart the popularity ranking of karaoke musical numbers, for instance.

Further the Gazette of the Japanese Patent Laid-open No. 210182/1995 (Reference 7), for example, discloses a karaoke system which uses the marking system at each terminal to evaluate the performance of each singer and transmits the results of evaluation to the host base station so that the marks can be compared among the individual karaoke apparatuses of the system.

However, the above-described systems or methods of the prior art involve the following problems.

A telecom karaoke system which, as disclosed in Reference 1 or 4, displays pictures and other additional information in synchronism with the performance of music can display only a limited quantity of pictures stored at the terminal, and displaying new information, not stored at the terminal, would require an advance transfer of pictorial data from the host station to the karaoke terminal, as described in Reference 2, or a transfer of pictorial data and musical data superposed on each other, as stated in Reference 5. The quantity of pictorial data is generally extremely large, and its transfer involves the problem of time and cost.

Furthermore, it is described in Reference 3 that news and other non-musical data are also stored at the host station and can be taken out and displayed at the terminals of the telecom karaoke system, but such data have nothing to do with the music of karaoke, and accordingly there is no advantage in linking the display of news and the like to the performance of music.

Another background circumstance, apart from the telecom karaoke systems described so far, is the presence of WWW, a hypermedia database on Internet. WWW can be accessed by using, for example, a WWW browser operating on a personal navigator. Available WWW browsers include Netscape Navigator and Internet Explorer. In the following description, personal computers, television sets and so forth mounted with a WWW browser will be generically referred to as WWW access terminals. WWW is connected worldwide through Internet, and a large number of hypermedia documents (WWW documents) have been prepared by organizations and individuals, with their number continuing to increase steadily.

One of the notable features of WWW is that, merely by designating an address called a uniform resource locator (URL), the corresponding WWW document can be immediately displayed on the WWW access terminal.

Given this background, if a telecom karaoke system is linked to WWW to make it possible to display a WWW document in synchronism with the performance of a piece of music on the telecom karaoke system, there will be no need to prepare or store the pictorial images to be displayed in advance at the host base station or to deliver to or store at the telecom karaoke terminal such images. WWW documents to be displayed at telecom karaoke terminals contain the text, still and moving pictures, and sounds, which are updated or augmented everyday by people everywhere in the world, and therefore the number of WWW documents available for display is virtually infinite.

Thus, while linking the performance of music on a telecom karaoke system and the displaying of a WWW document can provide a great advantage, there was no means to realize it.

Moreover, the conventional techniques described above have the disadvantage that the user cannot refer to data including the history of musical numbers he or she has so far selected by diverse means other than a telecom karaoke terminal. Thus, as stated in Reference 6, the historical data on the choice of music are accumulated at the host station only to be utilized for internal purposes, such as using data for advertising or, as described in Reference 7, the data were only subsequently put together to reveal popularity ranking. These problems derive from the circumstance that the host base station where musical data are accumulated and the managing server building up data on the choice of music among other things are managed in the same closed network.

The present invention, therefore, has been attempted in view of the above-enumerated problems, and its object is to provide a telecom karaoke system capable of sequentially displaying the contents of a WWW document in synchronism with the performance of music.

Another object of the invention is to provide a telecom karaoke system wherein, along with the performance of a piece of music, information related to the piece is updated on a WWW server by choosing the piece on a menu displayed on a WWW document.

SUMMARY OF THE INVENTION

In order to achieve the above-cited objects, a telecom karaoke system according to a first aspect of the present invention comprises:

a host base station for storing musical data consisting of data necessary for the performance of a musical number and storage address information of pictorial images to be displayed in synchronism with the performance of the musical number superposed on the necessary data for the performance;

a musical data receiving terminal for receiving said musical data from said host base station;

a signal separator for separating said musical data received by said musical data receiving terminal into said data necessary for the performance of the musical number and said storage address information, and supplying them separately;

a music playback device for performing the musical number in accordance with said data necessary for its performance supplied by said signal separator;

a server computer for providing pictorial images; and a pictorial image access terminal for receiving from said server computer pictorial images indicated by said storage address information supplied by said signal separator, and displaying them in synchronism with the performance of the musical number by said music playback device.

A telecom karaoke system according to a second aspect of the invention comprises:

a host base station for storing necessary data for the performance of music;

a server computer for storing a frame in which information for the selection of musical numbers is described;

a pictorial image access terminal for receiving from said server computer and displaying said frame, and entering an instruction to select a musical number in accordance with the information described in said frame; and a music playback device for receiving from said host base station necessary data for performing the musical number for which a selecting instruction has been entered from said pictorial image access terminal, and performing the musical number in accordance with those data, wherein, when an instruction to select a musical number is entered by a user from said pictorial image access terminal, said server computer stores the circumstances of the selection of the selected musical number, and further stores the circumstances of the selection of the musical number by the user.

Further, a telecom karaoke system according to a third aspect of the invention combines the features of the above-described telecom karaoke systems according to the first and second aspects of the invention.

DETAILED DESCRIPTION OF THE PREFERRED EMBODIMENTS

Preferred embodiments of the present invention will be described below.

A telecom karaoke system, which is a first preferred embodiment of the invention, sequentially displays, in synchronism with the performance of a musical number, contents of a WWW document which are related to the number under the control of a WWW access terminal by burying into various parts of pertinent musical data the address of the WWW document to be displayed in synchronism with the performance of the number.

In more detail, this embodiment of the invention comprises a host base station (101 in FIG. 1) in which many musical data, on which the address of a WWW document to be displayed is superposed, are stored; a musical data receiving terminal (102 in FIG. 1) having a function to receive musical data from the host base station and storing them as required; a signal separator (103 in FIG. 1) for sequentially reading musical data, and separating them into data necessary for the performance of a musical number and the address of the WWW document to be displayed or a control signal for WWW page access; a music playback device (104 in FIG. 1) for performing the musical number in response to the output of the signal separator; a WWW page access terminal (105 in FIG. 1) having a function to display the WWW document designated by an address supplied by the signal separator; a WWW server (106 in FIG. 1) having a function to connect the WWW page access terminal to Internet and WWW, and a display unit (107 in FIG. 1) for displaying the WWW document.

The first embodiment of the invention having such a configuration provides the benefit that the contents of a WWW document can be sequentially displayed in synchronism with the performance of music on telecom karaoke.

Thus, according to the prior art, as stated earlier, images to be displayed during the performance of music were stored in advance at the karaoke terminal or transmitted via a communication line together with musical data. In such conventional systems, there is a limit to the quantity of images stored in advance, and the transmission of images over a communication line along with musical data was inefficient. In either case, the provider of music has to supply images as well, and the production of images is a heavy load on the provider. Furthermore, the images are unilaterally supplied, but the user cannot interactively display other images or search for related information while looking at the supplied images.

The first embodiment of the present invention solves all these problems of the prior art in a stroke. On Internet, there are WWW documents produced by people all over the world, and they are constantly augmented and updated. Therefore, the number of WWW documents that can be displayed in synchronism with music is virtually infinite. There are many WWW documents produced by musicians, for instance. If, during the performance of a given musical number, the home page of its composer is displayed at the same time, the user will feel more familiar with and know more about that musician. Moreover, as the WWW document that is displayed is a hypertext with links to related documents, the user can search for pertinent information if necessary.

Figure 6:
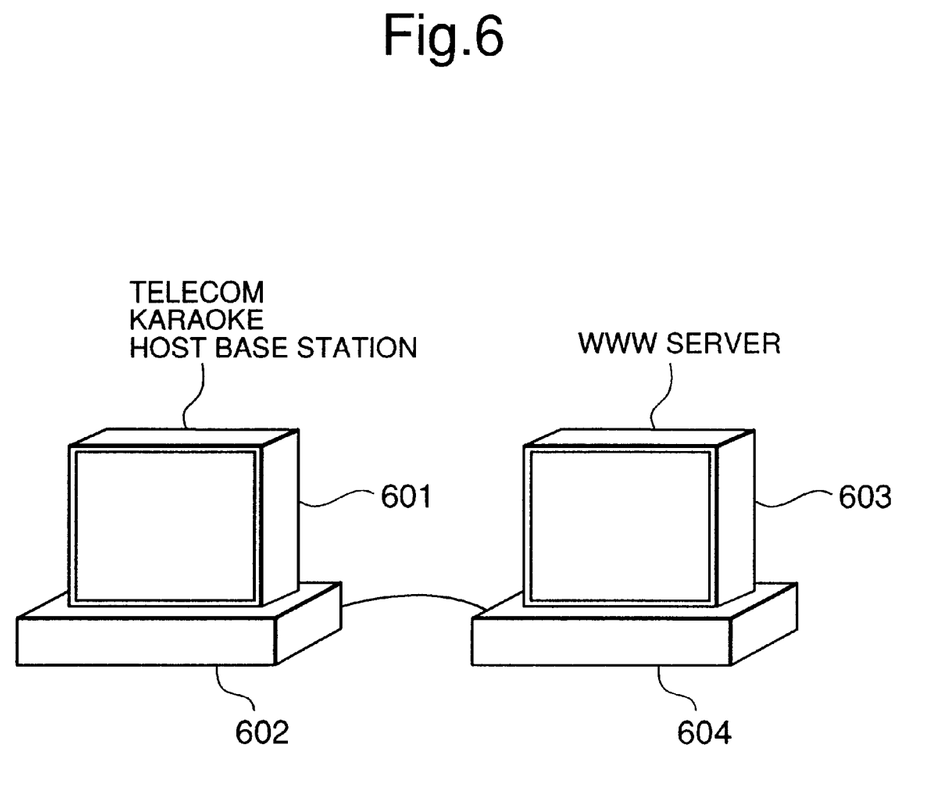
FIG. 6 is a perspective view of an example of external appearance of a system embodying the invention.

Incidentally, a system which is the first embodiment of the invention may have, for example, an external appearance as shown in the perspective view of FIG. 6.

In FIG. 6, numeral 601 denotes a display unit for displaying the text of music and pictorial images; 602, a telecom karaoke terminal for receiving from the host base station and playing musical data; 603, a display unit for displaying a WWW document; and 604, a WWW access terminal connected to a WWW server. The telecom karaoke terminal 602 and the WWW server 604 may either be connected to each other by a communication line or integrated.

Next will be described in further detail the first preferred embodiment of the invention with reference to FIG. 1.

Figure 1:
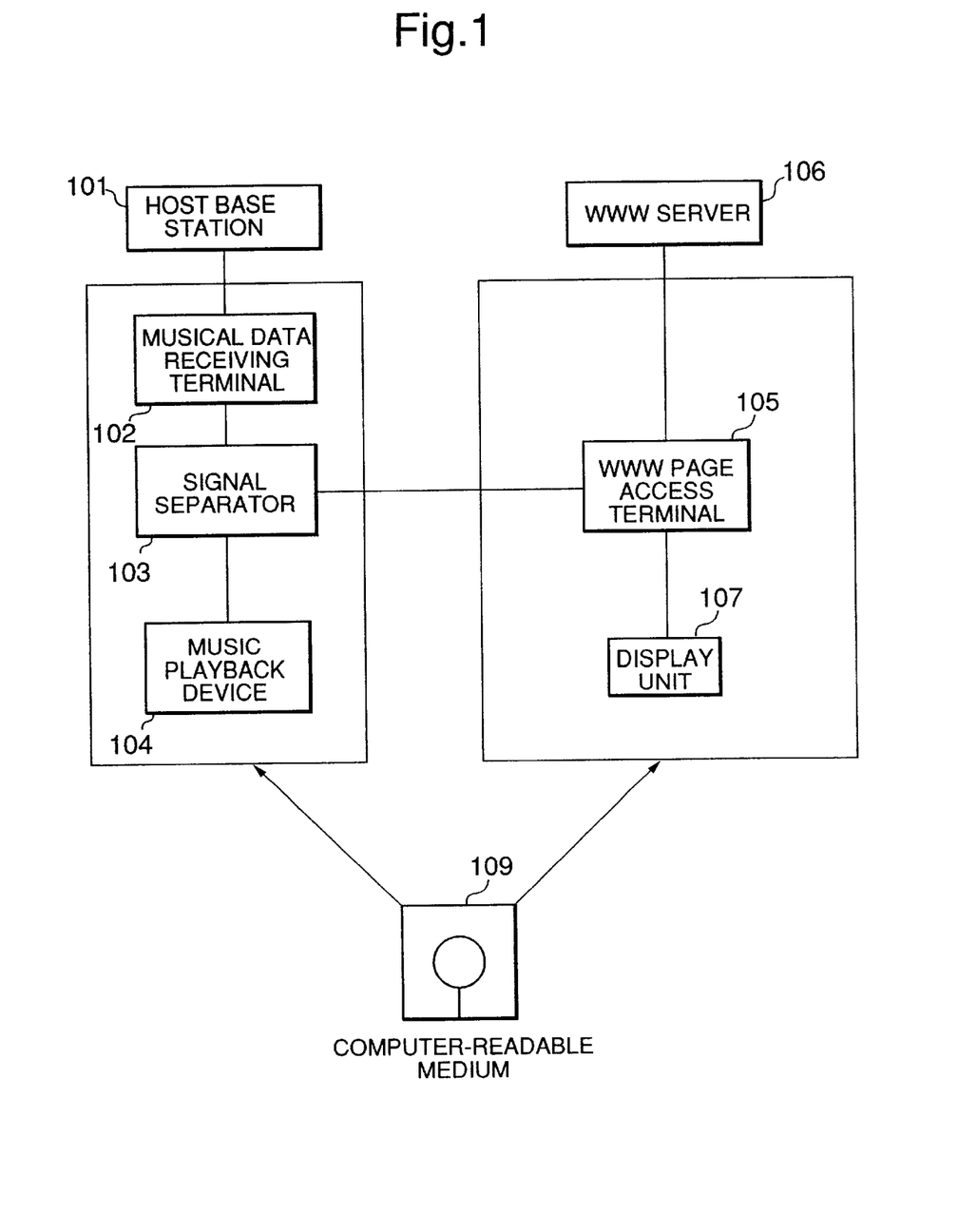
FIG. 1 is a block diagram illustrating the system configuration of a first preferred embodiment of the present invention.

Referring to FIG. 1, in this embodiment of the invention, the host base station 101, which is a host station to provide telecom karaoke service, is equipped with a function to transmit, upon request from a terminal, musical data out of its accumulation to the terminal. In this embodiment, if there is the page address of the WWW document to be displayed in synchronism with the performance of the music, the address is superposed over the musical data.

The musical data receiving terminal 102 receives and temporarily stores musical data transmitted from the host base station 101, and sequentially transmits them to the signal separator 103. The musical data receiving terminal 102, like a usual telecom karaoke terminal, consists of a communication control unit, a CPU, an I/O interface and a memory among other things. Incidentally, a karaoke receiving terminal like what is described in Reference 1 may as well be used.

The signal separator 13, intended to separate musical data sequentially delivered from the musical data receiving terminal 102 into necessary signals for the performance of music and the address of the WWW page to be displayed in synchronism with the performance of music, is composed of a program-controlled type CPU or the like. The necessary signals for the performance of music include, for example, signals conforming to the MIDI standard and PCM signals.

The music playback device 104, which is means to perform music in accordance with the necessary data for the performance of music supplied from the signal separator 103, consists of a MIDI player for instance.

The WWW page access terminal 105 displays, on the basis of a WWW page supplied from the signal separator 102, the WWW page. More specifically, it delivers the WWW page address to the WWW server 106, and receives data on the corresponding page. A personal computer mounted with a conventional WWW browser can be used for this purpose.

The WWW server 106, which is a conventional WWW server, has a function to access Internet with a protocol, such as Hyper-Text Transfer Protocol (HTTP), and take out a WWW document. The WWW server 106 consists of a work station mounted with WWW server software, a personal computer or the like.

The display unit 107, which is means to display the WWW document acquired by the WWW pages access terminal 105, may consist of a conventional display apparatus.

Figure 4:
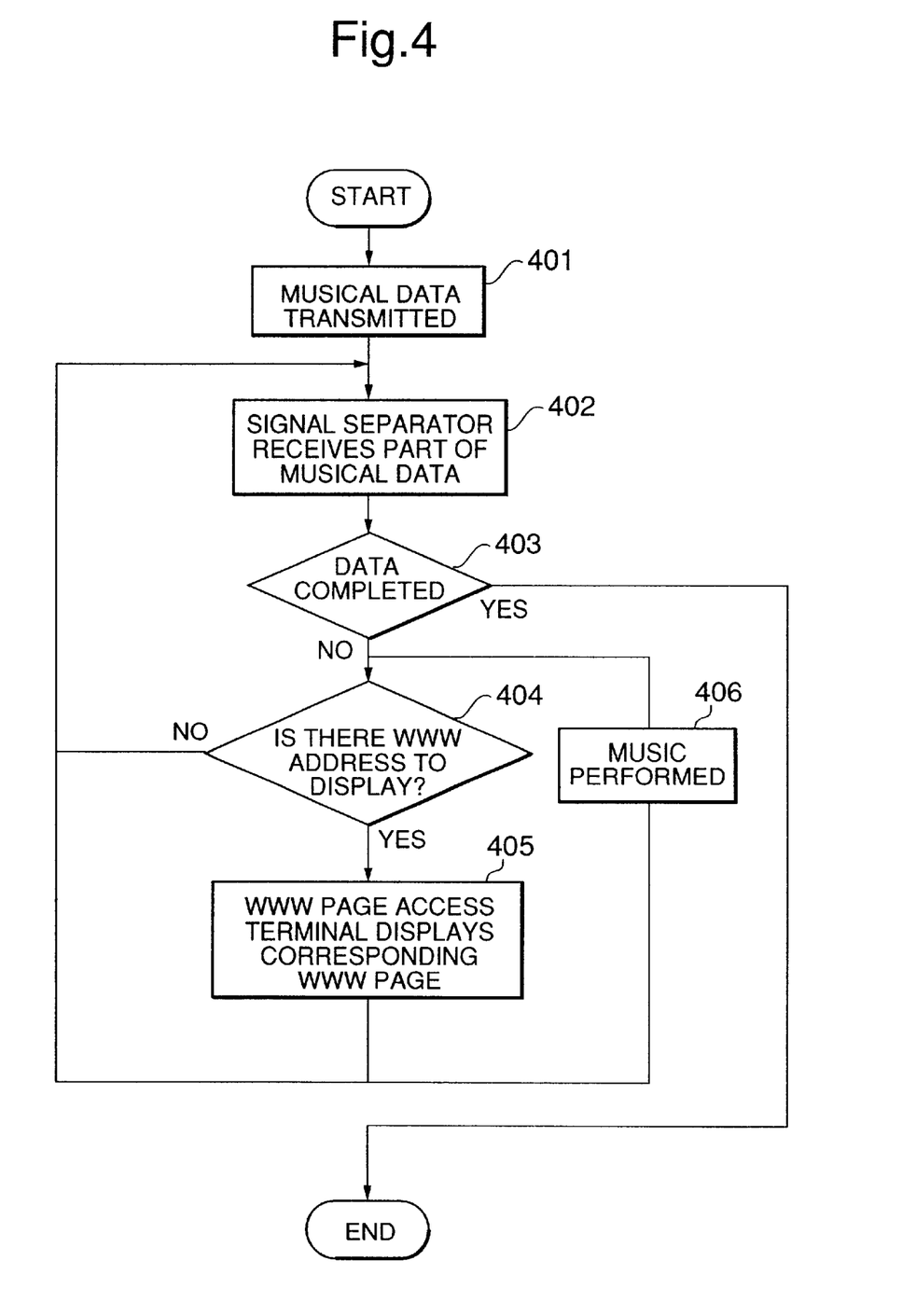
FIG. 4 is a diagram for describing the operation of the first embodiment of the invention, showing the processing flow to perform music and display a WWW document.

FIG. 4 illustrates the processing flow to play back music and display the WWW page in the first embodiment of the invention.

The operation of this embodiment will be described below with reference to FIGS. 1 and 4.

First, the musical data receiving terminal 102 receives musical data from the host base station 101 (step 401). This takes place at the request of a karaoke user or a karaoke terminal operator or as requested by the host base station 101. The whole or part of the received musical data is temporarily stored in a memory in the musical data receiving terminal 102.

Next, the musical data stored at the musical data receiving terminal 1 are sequentially delivered to the signal separator 103, which then receives them (step 402).

When the musical number ends and there are no more musical data (YES at step 403), the performance is completed. In the middle of the musical number (NO at step 403), the signal separator 103 checks whether or not the received signals include not only necessary data for the performance of music but also the address of a WWW page to be displayed in synchronism with music (step 404) and, if the address is included, notifies the WWW page access terminal 105 of its presence. The WWW page access terminal 105 reads out of the WWW server 106 the WWW page corresponding to the notified address, and displays it on the display unit 107 (step 405).

Or if the musical data have not yet run out at step 403, the music playback device 104 performs the musical number (step 406) in parallel with the displaying of the WWW page under the control of the WWW page access terminal 105.

In this manner, WWW pages are sequentially displayed in synchronism with the performance of music. If the address of a WWW page closely related to the musical number performed is superimposed on the musical data, the user can look at the pertinent WWW page while singing.

Thus is completed the operation of the first preferred embodiment of the present invention.

Another telecom karaoke system, which is a second preferred embodiment of the present invention, when the user chooses a musical number which he or she desires to sing from a menu or the like displayed on a WWW document, updates the data related to the musical number registered in the WWW server (the frequency of accesses to that number, and the like) on the basis of the choice, and performs the selected musical number.

In further detail, this embodiment comprises a WWW server (106 in FIG. 2) in which a WWW document containing a menu for selecting the musical number the user desires to sing, a WWW page access terminal (105 in FIG. 2) connected to the WWW server and having a function to display the WWW document, a display unit (107 in FIG. 2) for displaying the WWW document, an input unit (108 in FIG. 2) with which the user can make an input to the WWW page access terminal to select a menu or the like on the WWW document, a musical data receiving terminal (102 in FIG. 2) for taking out the required musical number from a host base station when notified of the selection of the number on the WWW page access terminal (or, if the data taken out are already stored, searching the stored data), the host base station (101 in FIG. 2) wherein musical data are stored, and a music playback device (104 in FIG. 2) for performing music.

The second embodiment of the invention having such a configuration provides the benefit that the user's choice of a musical number can be immediately reflected in the WWW document.

Thus, as stated above, telecom karaoke service according to the prior art was a closed network in which, even if popular numbers were listed up, the listed information could be seen nowhere else than where a telecom karaoke terminal was set up.

By contrast, the second embodiment of the present invention enables data on the user's musical choice to be immediately utilized on Internet because the choice he or she makes on a menu on a WWW document is immediately notified to the music playback device to start the performance of the chosen number and, in parallel with that, data related to that number are updated on the WWW server. For instance, the latest information on the popularity ranking of musical numbers on karaoke can be looked at on the WWW of Internet at any time. Since there are an enormous number of WWW access terminals, this provides a great benefit to the user.

Or if the user chooses a musical number after entering his or her ID or the like, the user can enjoy the benefit of his or her own home page being automatically made on the WWW. If the user sings a song at a karaoke studio or the like equipped with a telecom karaoke system, his or her home page will be automatically produced, and the home page will include the list of songs the user has sung as his or her repertoire. Moreover, this home page can be accessed and edited from a personal computer or the like without requiring him or her to visit a karaoke studio, the user, the next time he or she goes to a karaoke studio, can choose a song from a list registered in advance. Where the user's home page is to be automatically made from data on his or her choice of songs, if a photographic system is provided at the terminal so that the user's portrait can be automatically incorporated into his or her home page that is produced, the user's fun will further increase.

Incidentally, like the aforementioned first preferred embodiment of the invention, this second embodiment may also have an external appearance as illustrated in the perspective view of FIG. 6.

Next, the second preferred embodiment of the invention will be described in further detail with reference to FIG. 2.

Figure 2:
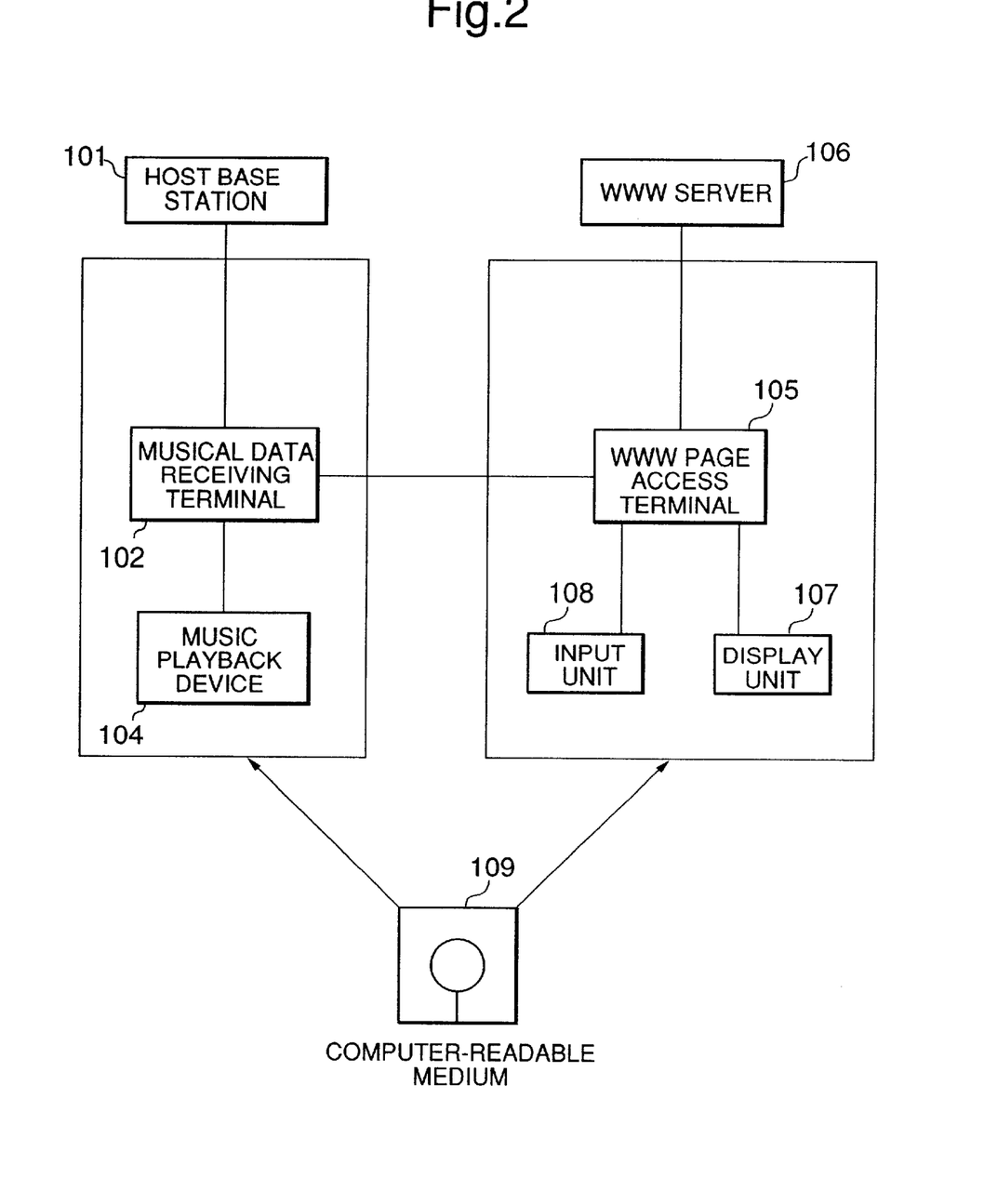
FIG. 2 is a block diagram illustrating the system configuration of a second preferred embodiment of the invention.

Referring to FIG. 2, in this embodiment, the host base station 101, like its counterpart in the above- described first embodiment, is a host station for providing telecom karaoke service, equipped with a function to transmit, upon request from a terminal, musical data out of its accumulation to the terminal.

In this second embodiment, unlike in the above- described first embodiment, the address of the WWW page to be in synchronism with musical data is not superposed.

Both the musical data receiving terminal 102 and the music playback device 104 are the same as their respective counterparts in the first embodiment described above. In this second embodiment, though, musical data are delivered as they are to the music playback device 104, and the musical data receiving terminal 102 has a function either to take out from the host base station the musical data on the number selected from the WWW page access terminal 105 or, if the musical data on the number selected are stored in itself, to deliver it to the music playback device 104.

The WWW page access terminal 105, too, is the same as its counterpart in the first embodiment described above. In the second embodiment, though, the WWW page access terminal 105 has a function to notify the musical data receiving terminal 102 of any operation the user may perform on a specific WWW document (more specifically, the user's choice of a song he or she desires to sing on the screen of the music selection menu).

The WWW server 106, like its counterpart in the first embodiment described above, is a usual WWW server, but that in this second embodiment in particular has a store of documents, including a menu for music selection on the WWW server 106, so that the user can choose on that screen a song he or she desires to sing.

The display unit 107 is the same as its counterpart in the first embodiment described above, and the input unit 108 is to enable the user to make an entry, such as menu selection, into the WWW document displayed by the WWW page access terminal 105. The input unit 108 may be a keyboard or a pointing device.

Figure 5:
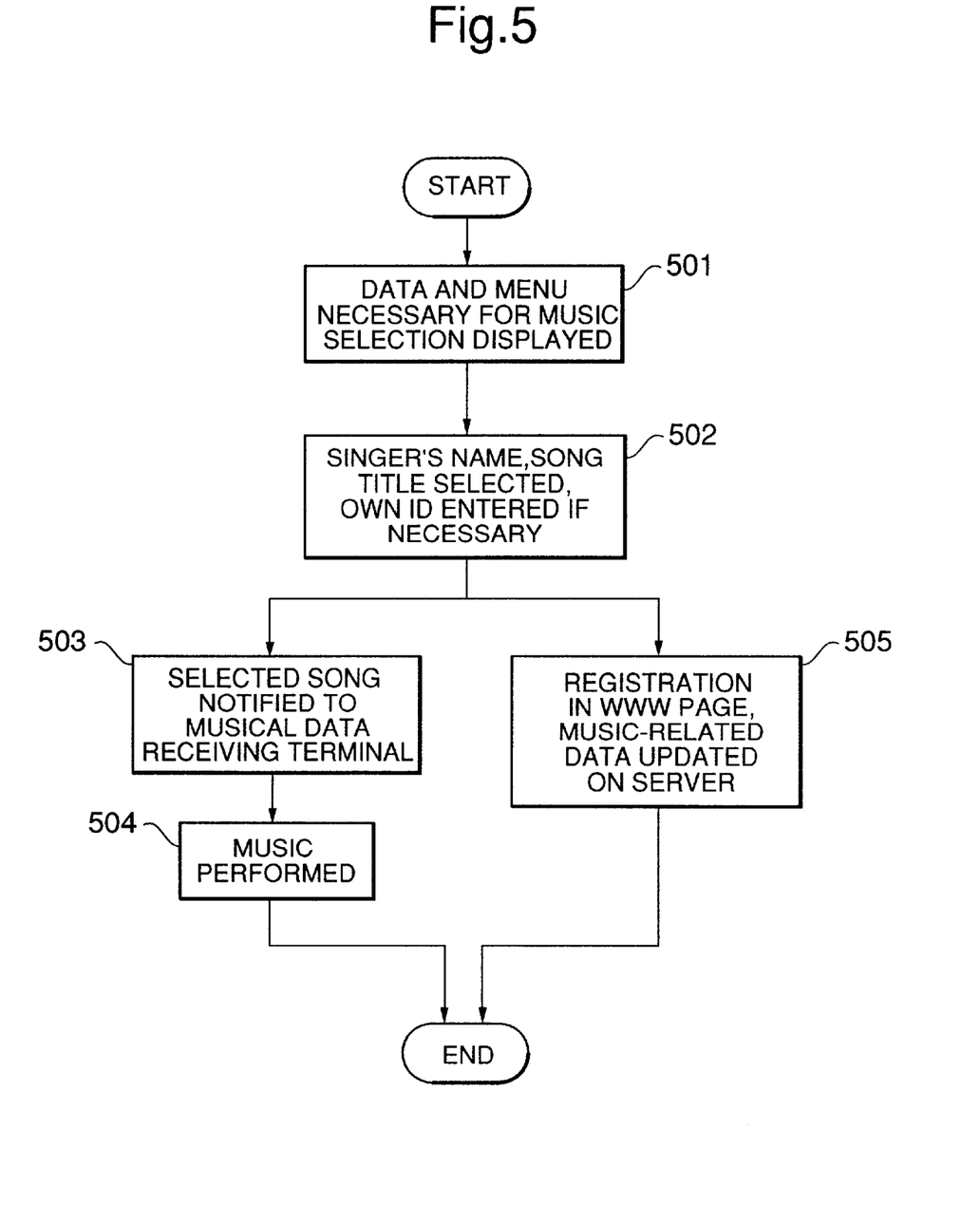
FIG. 5 is a diagram for describing the operation of the second embodiment of the invention, showing the processing flow to select a musical number and perform that number.

FIG. 5 illustrates an example of the processing flow, in the second embodiment of the invention, to enable the user to choose the musical number he or she desires to sing and the telecom karaoke terminal to perform that number.

The operation of this embodiment will be described below with reference to FIGS. 2 and 5.

First, the WWW page access terminal 105 displays on the display unit 107 (step 501) the data and menu the user requires in selecting a number he or she desires to sing. The data displayed here constitute the information the user requires in selecting a number, and include, for example, the singer's name, the writer's name, the composer's name and the title of the song.

Figure 7:
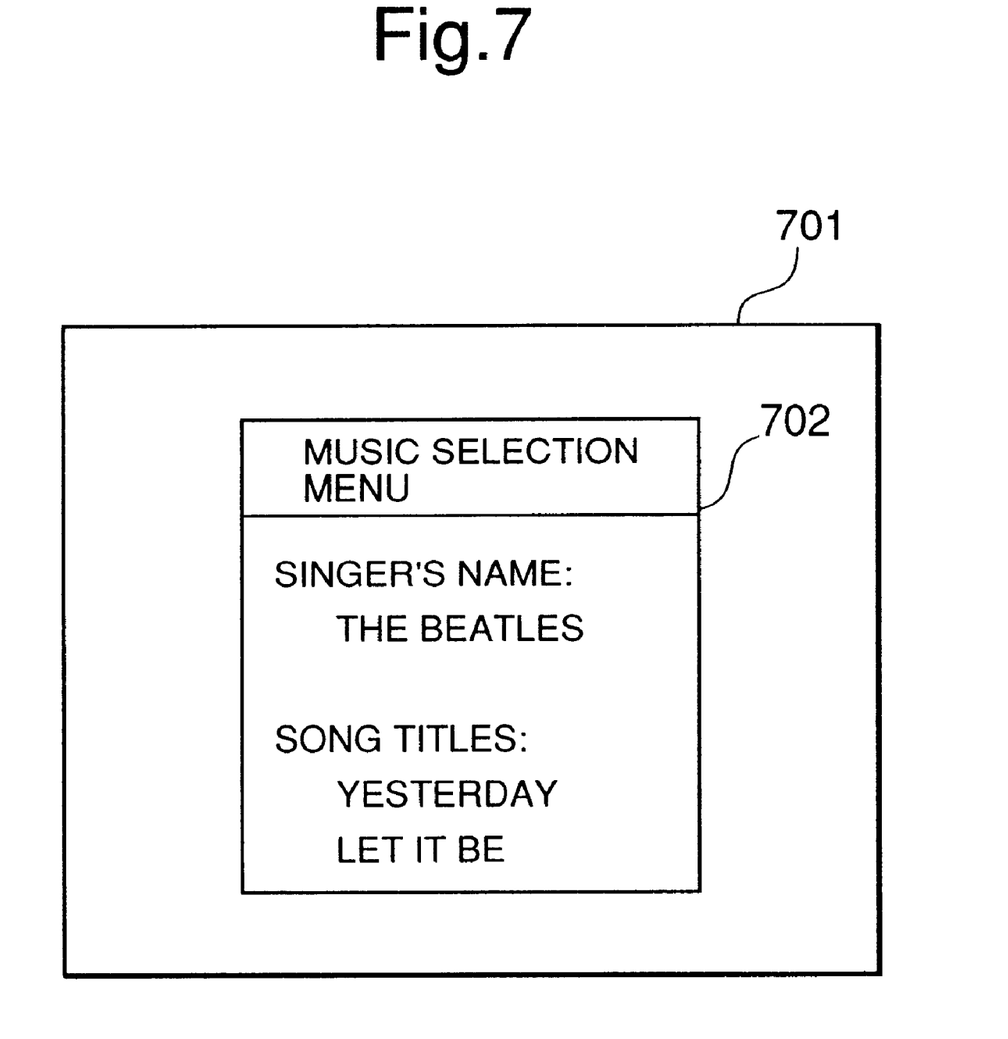
FIG. 7 is a diagram illustrating an example of screen display in the second embodiment of the invention.

FIG. 7 illustrates an example of frame displayed on the display unit 107 in the second embodiment of the invention. In FIG. 7, numeral 701 denotes a display frame, and 702, a WWW browser displayed therein. On the WWW browser are displayed the singer's name, the title of the song and other items the user requires in selecting a number he or she desires to sing.

On such a screen, the user instructs the choice of a number (step 502) by using, for example, a keyboard or a prescribed pointing device. Incidentally, the user may as well enter his or her own ID number or the like in advance of choosing a song. This is intended to store afterwards an ID number and the history of the song or songs selected by the bearer of the ID number among other things and prepare on that basis the user's own data.

Then, the WWW page access terminal 105 notifies the musical data receiving terminal 102 (step 503) of the number selected by the user, and the musical data receiving terminal 102 receives from the host base station 101 the required musical number and delivers it to the music playback device 104, which performs this number (step 504). However, the musical data receiving terminal 102, if the selected number is already stored in its memory, does not demand musical data from the host base station 101.

When the user selects a number at said step 502, information on the selected number is notified not only to the musical data receiving terminal 102 but also to the WWW server 106, which updates data related to the selected number (step 505). Here, the data related to the number include the past frequency of the choice of that number.

Data regarding the selection of musical numbers on these WWW page access terminals gather in the WWW server 106, as it is connected to many WWW page access terminals through Internet. Therefore, the frequency of the choice of each number can be used as the basis on which a popularity ranking of karaoke songs can be charted.

Figure 8:
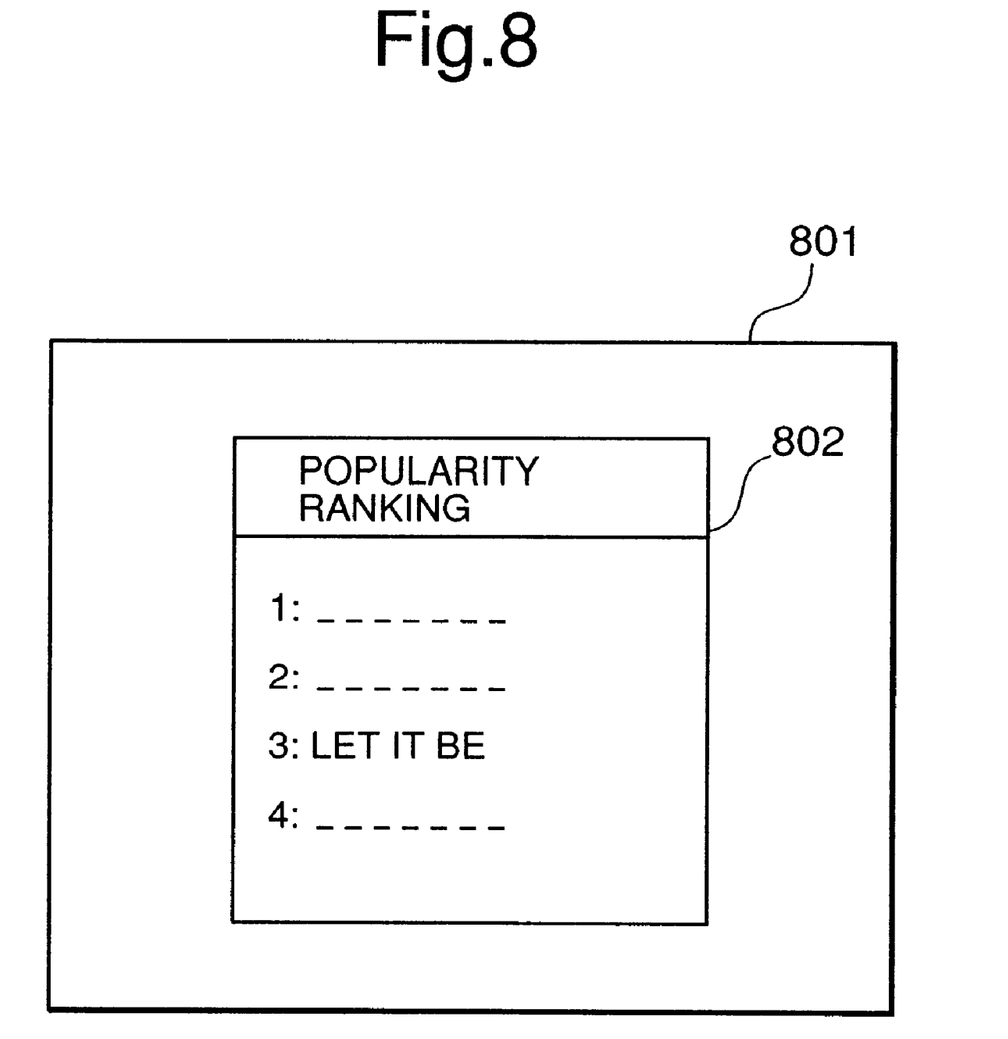
FIG. 8 is a diagram illustrating another example of screen display in the second embodiment of the invention.

FIG. 8 illustrates an example of frame showing a popularity ranking, supplied from this embodiment of the invention. In FIG. 8, numeral 801 denotes a display screen at the WWW access terminal, and 802, a WWW browser. In the WWW browser 802 is displayed a popularity ranking of songs. Furthermore, as described above, if the user entered his or her ID number in advance of choosing a number, the user's home page can be prepared on the WWW server 106 on the basis of the data. A home page is a kind of WWW document, and the user, by entering the address of his or her home page, can look at that home page from anywhere there is a WWW page access terminal.

Figure 9:
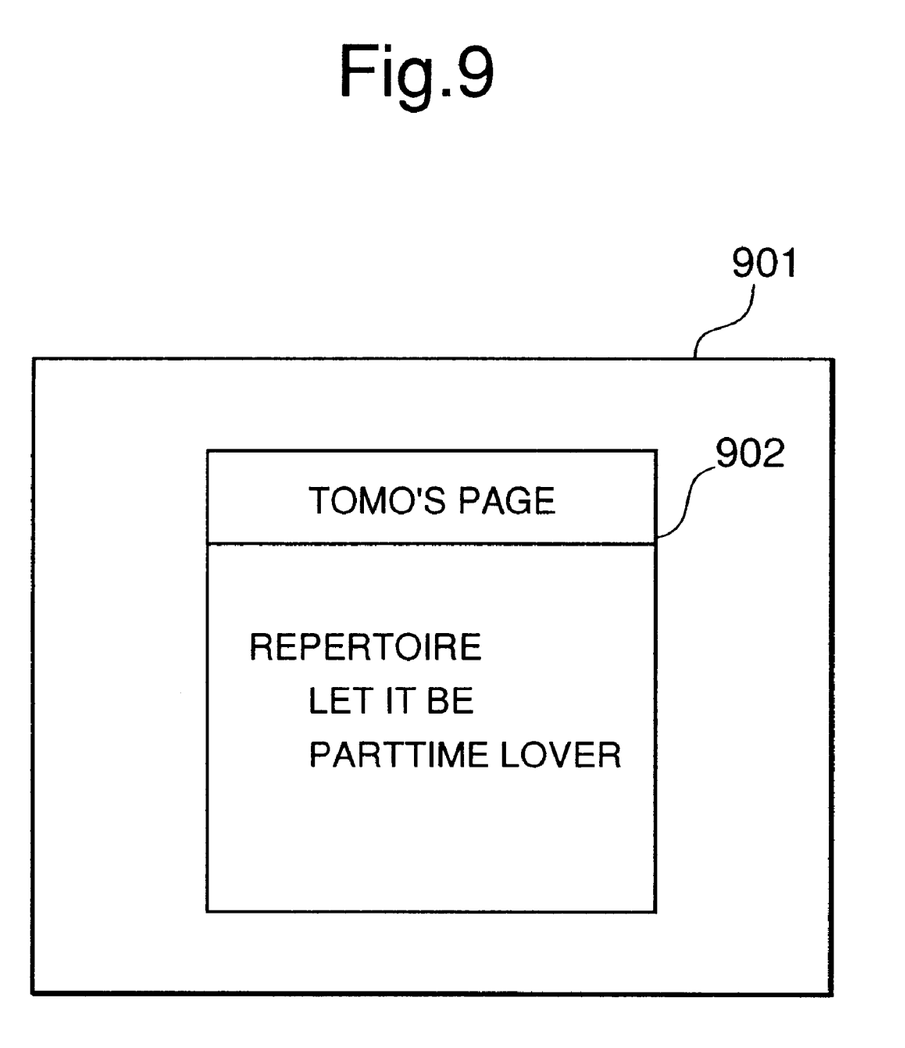
FIG. 9 is a diagram illustrating still another example of screen display in the second embodiment of the invention.

FIG. 9 illustrates an example of home page displayed on the screen of the WWW access terminal in the second embodiment of the invention. In FIG. 9, numeral 901 denotes a display screen, and 902, a WWW browser. FIG. 9 shows a screen shown when a certain person (whose ID is tentatively "Tomo") has accessed his or her home page. Here the list of songs Tomo has so far chosen is displayed as Tomo's repertoire.

Thus is completed the operation of the second embodiment of the present invention.

Further, a telecom karaoke system, which is a third preferred embodiment of the invention has functions of both the first and the second embodiments of the invention described above.

Thus, the third preferred embodiment of the invention, when the user chooses a song he or she desires to sing from a menu or the like displayed on a WWW document, updates on that basis the data related to musical numbers registered in the WWW server, at the same time performs the chosen number and, in synchronism with that, sequentially displays the contents of the WWW document.

In more detail, this embodiment comprises a host base station (101 in FIG. 3) in which is stored a large quantity of musical data on which the address of a WWW document to be displayed is superposed; a musical data receiving terminal (102 in FIG. 3) having a function to receive musical data from the host base station and store them as required; a signal separator (103 in FIG. 3) for reading musical data sequentially and separating them into data necessary for the performance of musical numbers and the address of a WWW document or the control signal of a WWW page access terminal to be displayed in synchronism with them; a music playback unit (104 in FIG. 3) for performing musical numbers in response to the output of the signal separator; a WWW page access terminal (105 in FIG. 3) having a function to display a WWW document designated by the user or the signal separator; a WWW server (106 in FIG. 3) which has a function to connect the WWW page access terminal to Internet and WWW and in which the WWW document containing, among other things, a menu for the user's selection of a song he or she desires to sing is registered; a display unit (107 in FIG. 1) for displaying the WWW document; and an input unit (108 in FIG. 2) with which the user can make an input to the WWW page access terminal to select a menu or the like on the WWW document.

The third preferred embodiment of the invention having such a configuration can provide the benefits of both the first and the second embodiments of the invention described above.

Incidentally, like the aforementioned first and the second embodiments of the invention, this third embodiment may also have an external appearance as illustrated in the perspective view of FIG. 6.

Next will be described the third embodiment of the invention in more detail with reference to FIG. 3.

Figure 3:
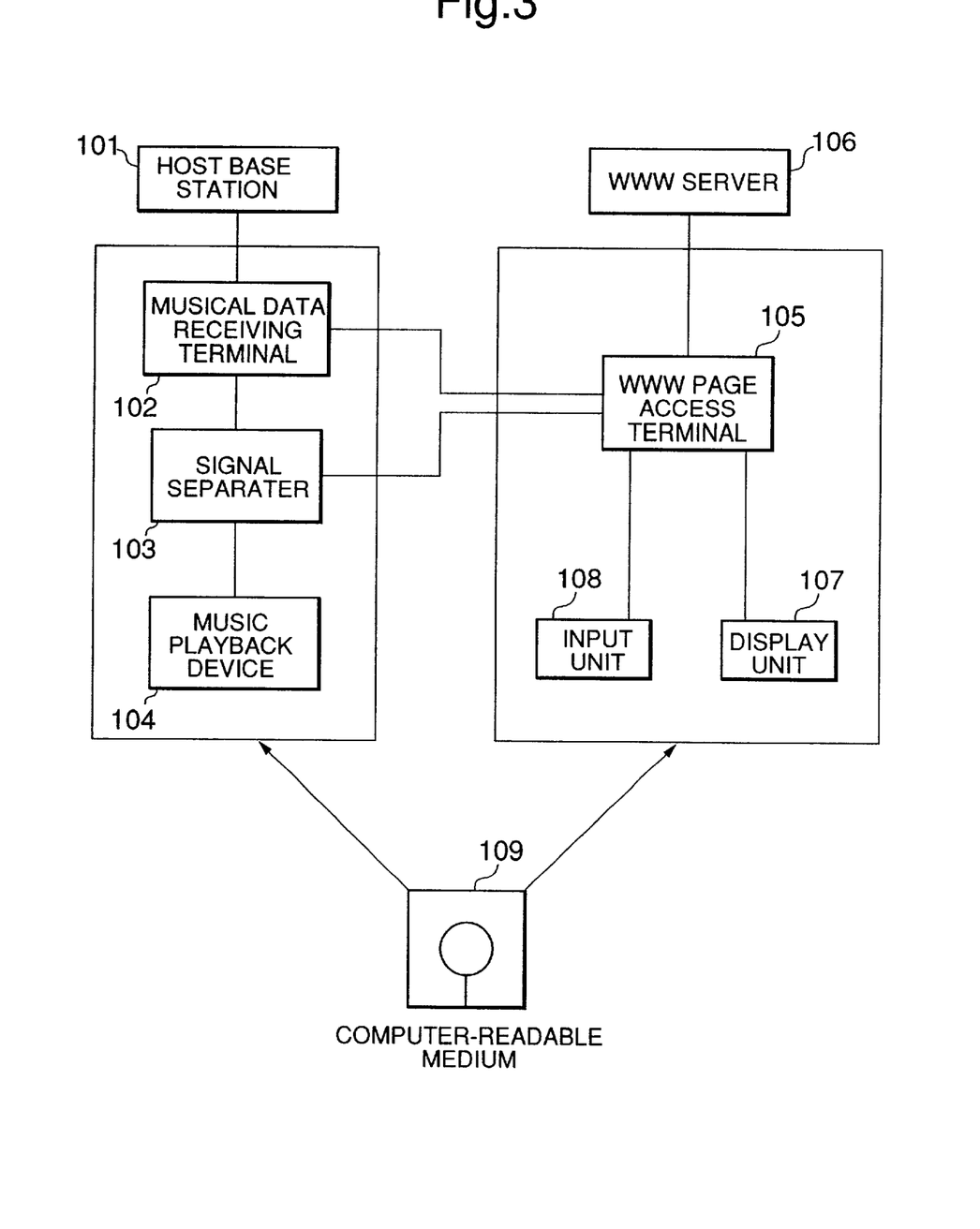
FIG. 3 is a block diagram illustrating the system configuration of a third preferred embodiment of the present invention.

Referring to FIG. 3, in this embodiment, the host base station 101, like its counterpart in the above-described first and second embodiments, is a host station for providing telecom karaoke service, equipped with a function to transmit, upon request from a terminal, musical data out of its accumulation to the terminal.

In this third embodiment, like in the above-described first embodiment, the address of the WWW page to be in synchronism with musical data is superposed.

Both the musical data receiving terminal 102 and the music playback device 104 are the same as their respective counterparts in the first embodiment described above. In this third embodiment, though, the musical data receiving terminal 102 has a function either to take out from the host base station 101 the musical data on the number selected from the WWW page access terminal 105 or, if the musical data on the number selected are stored in itself, to deliver it to the music playback device 104.

The signal separator 103, like its counterpart in the first embodiment described above, separates musical data sequentially delivered from the musical data receiving terminal 102 into necessary signals for the performance of music and the address of the WWW page to be displayed in synchronism with the performance of music.

The WWW page access terminal 105 has in combination a function to display a WWW page on the basis of the address of the WWW page supplied from the signal separator 103, like its counterpart in the first embodiment described above, and a function to notify the musical data receiving terminal 102 of any operation the user may perform on a specific WWW document as its counterpart does in the second embodiment.

The WWW server 106 is a usual WWW server, like its counterpart in the first embodiment described above, but in particular has a store of documents, including a menu for music selection, as its counterpart in the second embodiment does.

The display unit 107 combines the functions of its counterparts in the first and second embodiments, while the input unit 108 is the same as that in the second embodiment described above.

Having such a configuration, the third preferred embodiment of the invention performs an operation combining those of the first and second embodiments.

Thus, when the user selects a musical number, the selected number is notified from the WWW page access terminal 105 to the musical data receiving terminal 102 and, when the number is performed, the musical data receiving terminal 102 notifies the WWW page access terminal 105 of the address of the WWW document to be displayed in synchronism with the selected number.

Any of the first, second and third preferred embodiments described above may further be equipped with a computer-readable 109 in which a control program for the telecom karaoke system is to be recorded as illustrated in FIGS. 1, 2 and 3, respectively. In this case, the host base station 101, musical data receiving terminal 102, signal separator 103, music playback device 104, WWW page access terminal 105, WWW server 106, display unit 107 and input unit 108 perform respectively the same actions under the control of the telecom karaoke system recorded in the computer-readable 109 as those described above in respect of the first, second and third embodiments. Incidentally, this computer-readable may be a magnetic disk, a semiconductor memory or some other proper medium.

Although telecom karaoke systems in which music is performed in synchronism with the display of a page or a document on WWW have been described so far, any other network system than WWW can as well be used if it can provide a page or a document to be displayed in synchronism with musical performance.

The foregoing description should make it clear that telecom karaoke systems according to the present invention afford the following benefits.

(1) According to the invention, during musical performance, contents of a WWW document can be sequentially displayed in synchronism with the musical number performed.

According to the prior art, images to be displayed during the performance of music were stored in advance at the karaoke terminal or transmitted via a communication line together with musical data. In such conventional systems, there is a limit to the quantity of images stored in advance, and the transmission of images over a communication line along with musical data was inefficient. In either case, the provider of music has to supply images as well, and the production of images is a heavy load on the provider. Furthermore, the images are unilaterally supplied, but the user cannot interactively display other images or search for related information while looking at the supplied images.

The present invention solves all these problems in a stroke. On Internet, there are WWW documents produced by people all over the world, and they are constantly augmented and updated. Therefore, the number of WWW documents that can be displayed in synchronism with music is virtually infinite. There are many WWW documents produced by musicians, for instance. If, during the performance of a given musical number, the home page of its composer is displayed at the same time, the user will feel more familiar with and know more about that musician. Moreover, as the WWW document that is displayed is a hypertext with links to related documents, the user can search for pertinent information if necessary.

Thus, the invention can afford a great benefit to the user by displaying a WWW document, during musical performance by telecom karaoke service, in synchronism with the musical number that is performed.

(2) According to the invention, the choice of a musical number by a user can be immediately reflected in the WWW document.

Telecom karaoke service according to the prior art was a closed network in which, even if popular numbers were listed up, the listed information could be seen nowhere else than where a telecom karaoke terminal was set up.

The present invention enables data on the user's musical choice to be immediately utilized on Internet because the choice he or she makes on a menu on a WWW document is immediately notified to the music playback device to start the performance of the chosen number and, in parallel with that, data related to that number are updated on the WWW server. For instance, the latest information on the popularity ranking of musical numbers on karaoke can be looked at on the WWW of Internet at any time. Since there are an enormous number of WWW access terminals, this provides a great benefit to the user.

Or if the user chooses a musical number after entering his or her ID or the like, the user can enjoy the benefit of his or her own home page being automatically made on the WWW. If the user sings a song at a karaoke studio or the like equipped with a telecom karaoke system, his or her home page will be automatically produced, and the home page will include the list of songs the user has sung as his or her repertoire. Moreover, this home page can be accessed and edited from a personal computer or the like without requiring him or her to visit a karaoke studio, the user, the next time he or she goes to a karaoke studio, can choose a song from a list registered in advance. Thus, where the user's home page is to be automatically made from data on his or her choice of songs, if a photographic system is provided at the terminal so that the user's portrait can be automatically incorporated into his or her home page that is produced, the user's fun will further increase.

(3) Furthermore, the present invention, enables the effects described in (1) and (2) above to be realized at the same time.

What is claimed is:

1. A karaoke system coupled to a world wide web (WWW) server that stores WWW documents of a menu for selecting a musical number to be played, and records information regarding a selection result of said menu, comprising:

a WWW server access terminal, which is connected to said WWW server, and which retrieves WWW documents of said menu from said WWW server, and outputs selected information of said menu for renewing said information regarding selection results recorded in said WWW server;

a host base station which stores necessary data for performance of music; and a terminal apparatus, which is connected to said WWW server access terminal and said host base station respectively, and which receives said selected information output from said WWW server access terminal, requests musical data corresponding to said information from said WWW server access terminal to said host base station, and performs the musical number in accordance with received musical data from said host base station.

2. A karaoke system coupled to a world wide web (WWW) server that stores WWW documents including a menu for selecting a musical number to be played, and storing information regarding selection of the musical number, comprising:

a WWW server access terminal, which is connected to said WWW server, which retrieves WWW documents from said WWW server in accordance with address information received, displays contents of said WWW document including said menu, and outputs related information selected in conjunction with said displayed WWW document including said menu for renewing management data stored in said WWW server, a host base station which stores musical data including data necessary for the performance of a musical number and address information of the WWW document to be retrieved related to said musical number; and a terminal apparatus, which is connected to said WWW server access terminal and said host base station respectively, and which receives information output from said WWW server access terminal, requests musical data corresponding to said information from said WWW server access terminal to said host base station when said information relates to contents of said menu, performs the musical number in accordance with received musical data from said host base station, and transfers said address information separated from received musical data from said host base station to said WWW server access terminal.

3. A karaoke system, as claimed in claim 2, wherein said management data is renewed in said WWW server based on the information regarding the selection of the musical number, and wherein said management data includes a ranking of musical numbers based on selections of the musical numbers as made by users accessing said WWW server within a particular time period, and wherein the ranking is provided to the users accessing said WWW server for assistance in making a music selection from said menu.

4. A karaoke system coupled to a world wide web (WWW) server that stores WWW documents including a menu for selecting a musical number to be played, and storing information regarding selection of the musical number, comprising:

a WWW server access terminal, which is connected to said WWW server, and which retrieves WWW documents from said WWW server in accordance with address information received, displays contents of said WWW document including said menu, and outputs related information selected in conjunction with said displayed WWW document including said menu for renewing management data stored in said WWW server, a host base station which stores musical data including data necessary for the performance of a musical number and address information of the WWW document to be retrieved related to said musical number;

a musical data receiving terminal, which is connected to said WWW server access terminal and said host base station respectively, and which receives information output from said WWW server access terminal, requests musical data corresponding to said information from said WWW server access terminal to said host base station when said information relates to contents of said menu;

a signal separator, which is connected to said WWW server access terminal and said musical data receiving terminal respectively, and which separates said musical data received by said musical data receiving terminal into said data necessary for the performance of the musical number and said address information, and outputs them separately, wherein said address information is supplied to said WWW server access terminal; and a music playback device, which is connected to said signal separator, and which receives said data necessary for the performance of the musical number, and plays the musical number in accordance with said data output from said signal separator.

5. A karaoke system, as claimed in claim 4, further comprising:

a video display unit, which is connected to said signal separator and to said WWW server, and which provides said address information that corresponds to a WWW page, to said WWW server, and which receives data corresponding to the WWW page from said WWW server for displaying on said video display unit at a same time said musical number is being played by said music playback device.

6. A method used in a telecom karaoke system that is coupled to a world wide web (WWW) server that stores WWW documents of a menu for selecting a musical number to be played, and which records information regarding a selection result of said menu, the system including a host base station for storing necessary data for the performance of music and a terminal apparatus for performing said musical number in accordance with the data, the method comprising:

displaying the menu for selecting a musical number at said terminal apparatus, the menu being obtained from the WWW server;

transferring, when the musical number is selected in accordance with the menu displayed at said terminal apparatus, necessary data for the performance of the selected number from said host base station to said terminal apparatus;

performing the musical number at said terminal apparatus in accordance with said transferred data; and renewing the information regarding selection results of said menu recorded in said WWW server.

7. A method used in a telecom karaoke system that is coupled to a world wide web (WWW) server that stores WWW documents including a menu for selecting a musical number to be played, and which records information regarding selection results of said menu, the method comprising:

storing, at said host base station, musical data that includes data necessary for the performance of said musical number and address information of the WWW document to be retrieved related to said musical number;

transferring said musical data from said host base station to said terminal apparatus;

displaying the menu for selecting a musical number at said terminal apparatus;

transferring, when the musical number is selected in accordance with the menu displayed at said terminal apparatus, musical data on the selected musical number from said host base station to said terminal apparatus;

playing back at said terminal apparatus, in accordance with the data necessary for the performance of said musical number, contained in the transferred musical data;

displaying images indicated by said address information in the transferred musical data in parallel with the performance of the number at said terminal apparatus, the images being obtained from said WWW server in accordance with said address information; and renewing the information regarding selection results of said menu recorded in said WWW server.

8. A computer-readable medium that is used in a system coupled to a world wide web (WWW) server that stores WWW documents of a menu for selecting a musical number to be played, and the WWW server records information regarding selection results of said menu, the computer-readable medium comprising:

a computer-readable data storage device;

a program stored on said device, said program causing a computer:

to display the menu for selecting a musical number, the menu being obtained from the WWW server;

to receive, when the musical number is selected in accordance with the menu, necessary data for the performance of said selected number from a host base station storing necessary data for the performance of musical numbers;

to perform the musical number in accordance with the received data; and to renew the information regarding selection results of said menu recorded in said WWW server.

9. A computer-readable medium that is used in a system coupled to a world wide web (WWW) server that stores WWW documents including a menu for selecting a musical number to be played, and the WWW server records information regarding selection results of said menu, the computer-readable medium comprising:

a computer-readable data storage device;

a program stored on said device, said program causing a computer:

to display, at a musical data receiving terminal, the menu for selecting a musical number is described, the menu being obtained from the WWW server;

to renew the information regarding selection results of said menu recorded in said WWW server;

to receive, when the musical number is selected in accordance with the a selection made from the menu, from a host base station storing said musical data including data necessary for the performance of a musical number and address information of pictorial images to be displayed in parallel with the performance of said musical number, the address information superposed on the necessary data for the performance, the address information indicating where in said WWW server the corresponding pictorial images are located;

to perform the musical number in accordance with the necessary data for the performance of said number contained in the received musical data; and to display images indicated by said storage address information contained in the received musical data in parallel with the performance of the musical number.

10. A karaoke system coupled to a world wide web (WWW) server that stores WWW documents of a menu for selecting a musical number to be played, and accumulates data regarding the selection of the musical number from a plurality of musical numbers, comprising:

a WWW server access terminal, which is connected to said WWW server, and which retrieves WWW documents of said menu from said WWW server, and outputs selection data regarding the selection of the musical number to said WWW server;

a host base station which stores necessary data for performance of music; and a terminal apparatus, which is connected to said WWW server access terminal and said host base station respectively, and which receives the selection data output from said WWW server access terminal, requests musical data corresponding to the selection data from said WWW server access terminal to said host base station, and performs the musical number in accordance with received music data from said host base station.

11. A karaoke system coupled to a world wide web (WWW) server that stores WWW documents of a menu for selecting a musical number to be played, and accumulates data regarding the selection of the musical number of each user from a plurality of musical numbers, comprising:

a WWW server access terminal, which is connected to said WWW server, and which retrieves WWW documents of said menu from said WWW server, and outputs selection data regarding the selection of the musical number and including the user's information to said WWW server;

a host base station which stores necessary data for performance of a music; and a terminal apparatus, which is connected to said WWW server access terminal and said host base station respectively, and which receives the selection data output from said WWW server access terminal, requests musical data corresponding to the selection data from said WWW server access terminal to said host base station, and performs the musical number in accordance with received music data from said host base station.

* * * * *